United States Patent [19]

Goldberg et al.

[11] 3,931,067
[45] Jan. 6, 1976

[54] HYDROPHOBIC MICROPOROUS MATERIALS AND PROCESS FOR PRODUCING SAME

[75] Inventors: Bruce S. Goldberg, Clifton, N.J.; Dennis E. Johnson, Cambridge, Mass.

[73] Assignee: Amerace Corporation, New York, N.Y.

[22] Filed: Aug. 16, 1974

[21] Appl. No.: 498,154

[52] U.S. Cl. ......... 260/2.5 M; 260/42.15; 260/42.14
[51] Int. Cl.² ... C08K 3/24; C08K 3/34; C08K 3/36; C08K 5/02
[58] Field of Search ................................ 260/2.5 M

[56] References Cited
UNITED STATES PATENTS
3,862,030   1/1975   Goldberg.......................... 260/2.5 M

*Primary Examiner*—Joseph L. Schofer
*Assistant Examiner*—F. R. Cervi
*Attorney, Agent, or Firm*—S. Michael Bender; Richard A. Craig; Gregory J. Battersby, Jr.

[57] ABSTRACT

A normally hydrophilic microporous material having a polymeric matrix and a filler dispersed throughout the matrix wherein the filler contains active polar groups, is rendered hydrophobic by exposing the material to a reactive compound. In one preferred embodiment of the invention the reactive compound is a silane or a silazane whereas in another preferred embodiment the reactive compound is a Werner-type complex of fatty acids coordinated with a metal. The treated microporous material is rendered impervious to water-based liquids but remains pervious with respect to vapors or gases.

38 Claims, No Drawings

HYDROPHOBIC MICROPOROUS MATERIALS AND PROCESS FOR PRODUCING SAME

The present invention relates generally to microporous materials and more specifically, to normally hydrophilic microporous materials which have been treated in such a manner as to be rendered hydrophobic, that is, impervious to water-based liquids.

It is known to prepare microporous materials comprising a polymeric matrix or binder having particles of filler material dispersed throughout the matrix. The microporous nature of such materials is manifested by a network of microvoids or micropores extending throughout the matrix or binder, between neighboring particles of the dispersed filler, or between neighboring particles of the filler and portions of the polymeric matrix. Due to the many interconnections between these micropores the material is extremely hydrophilic, that is, water-based liquids rapidly soak the material and pass through even without any applied pressure. Because of its excellent wettability characteristic as well as other factors such hydrophilic microporous materials have been previously used as separators between the cell plates or electrodes of an electric storage battery as evidenced, for example, by the disclosures in the U.S. Pat. to Witt et al, No. 2,772,322, and Selsor et al, U.S. Pat. No. 3,696,061.

A long felt need has existed for a microporous material which rather than being hydrophilic as in the case of the prior art battery separator is hydrophobic, that is, impervious to water-based liquids, but which remains pervious to other liquids such as the hydrocarbons as well as remaining pervious to vapors and gases of all types. Without limiting the present invention, such hydrophobic microporous materials may advantageously be utilized, for example, in the fabrication of breatheable, water repellent clothing and upholstery.

Accordingly, it is an important object of the present invention to provide a process for treating a normally hydrophilic microporous material whereby the latter is rendered hydrophobic.

It is another important object of the present invention to provide a microporous material that is hydrophobic yet substantially pervious to the flow of vapors or gas therethrough.

To accomplish the foregoing and other objects, the present invention generally contemplates the preparation of a normally hydrophilic microporous material comprising a polymeric matrix having a filler material containing active polar groups dispersed throughout the matrix, and the subsequent exposure of the material to a reactive compound such as, for example, the silanes or the silazanes, or alternatively, a Werner-type complex of fatty acids coordinated with a metal, so as to form a hydrophobic coating inside the interstices or pores of the microporous material. In the former case, it is believed that the reaction is between the active polar groups of the filler component in the microporous material with the silane or silazane to form siloxanes whereas in the latter case where Werner-type complexes are employed as the reagent, these active polar groups are believed to react with the free hydroxyl or associated hydroxyl groups of the fatty acids or the reaction may involved the active polar groups reacting with the associated hydroxyl groups of the fatty acids or the reaction may involve the active polar groups reacting with the associated coordinate metal.

A more complete understanding as well as still other objects and advantages of the present invention will be made apparent from a study of the following detailed explanation thereof.

Preferably, the hydrophobic microporous material of the present invention may be prepared by utilizing as the polymeric binder material therefor either thermoplastic resins such as polyvinyl chloride or copolymers thereof, or synthetic or natural thermosetting rubber polymers or copolymers thereof. If formed of rubber-like polymers, the latter, with additives such as anti-degradants, cross-linking agents, inert fillers, or the like normally employed by those skilled in the art of compounding thermosetting compounds, are intimately mixed using conventional methods with either silica hydrogel or precipitated hydrated silica (i.e., silicic acid (n Si $O_2$-m $H_2O$) where n and m are integers) the latter being available commercially, for example, under the trademark Hi-Sil from PPG Industries. The resultant compound is then formed into a sheet, preferably by calendering onto a suitable carrier (i.e., paper or a thin metal sheet or screen), wound on reels of convenient size, and then vulcanized under hydrostatic conditions in a steam autoclave to an appropriate state of cure using pressurized steam as the source of heat. The vulcanized sheet is then dried in a warm dry air stream which also serves to dehydrate the silica. Such dehydration results in the formation of micropores in the sheet caused by the shrinkage of the silica thereby forming a normally hydrophilic microporous article.

In the finished state a typical thermoset rubber-like polymeric based microporous sheet before being treated with the hydrophobic reagents of the invention contains about 1 part of rubber-like polymer to about 0.5 parts silica by weight, and is about 60 per cent porous on a volume basis. The pore size distribution is typically rather wide, varying from about 0.05 to 10 microns for the most part according to mercury intrusion data, the mean pore size being typically about 1.4 micron. Such thermoset rubber-like polymeric sheets before treatment with the hydrophobic reagents of the present invention are normally hydrophilic and liquid water soaks rapidly into the material, passing through without any applied pressure, indicating that the micropores are substantially interconnected. Such sheets, and the process of making same, are known in the prior art.

A similar process may be used with synthetic thermoplastic polymers such as polyvinyl chloride (PVC). A formulation comprising finely divided PVC, a suitable solvent such as cyclohexanone, finely divided hydrated silica (preferably precipitated silica) and water is prepared, preferably by thoroughly intermixing the PVC with the silica and then directing the liquid components into the PVC and hydrated silica mixture. The resulting composition is then formed into a sheet or tube, etc. by extruding, calendering or other molding techniques. After extrusion, the extrudate is immersed in a suitable extraction medium such as a water bath, for example, for about 15 minutes at 80°C to leach out or extract the solvent. The leached or extracted sheet or tube, etc., is then dried at a temperature below the fusion point of the PVC to dehydrate the silica and also to remove from the extrudate the last traces of water and solvent. The displacement of the solvent from the extrudate with water and subsequent dehydration results in the formation of micropores in the material caused by the shrinkage of the silica thereby forming a normally hydrophilic microporous structure.

In the finished state, a typical thermoplastic polymeric based microporous sheet before treatment with the hydrophobic reagents of the present invention contains about one part PVC to about 1.4 parts silica by weight, and it is 65 – 70 per cent porous. The pore size distribution is typically rather wide, varying from about 0.05 to 4 microns for the most part according to mercury intrusion test data, the mean pore size being typically about 0.75 micron. Such sheets before being treated in accordance with the invention are normally hydrophilic and liquid water soaks rapidly into the material, passing through without any applied pressure, indicating that the micropores are substantially interconnected from surface to surface. Such sheets, and the process for making same, are explained in greater detail in the aforementioned U.S. Pat. Nos. 2,772,322 and 3,696,061.

In accordance with the present invention, the dried finished polymeric microporous materials described above may then be treated by exposure to a wide variety of substituted silanes or silazanes or to a Werner-type complex of fatty acids coordinated with a metal, for sufficient time to render the surfaces of the sheet, at least within the pores, hydrophobic. It will be appreciated that the hydrophobic characteristics of the sheets thus treated arise in a manner quite different from the usual waterproofing by condensation of silanes or siloxanes to form a thin surface coating. In the present invention, for example, it is believed that the hydrophobic nature is imparted by a reaction of a hydrophobic or hydrophilic agent with the active polar groups of the filler material or component dispersed through the polymeric matrix of the microporous material and does not involve reaction with the polymeric matrix itself. The reaction product is thus rendered hydrophobic due to the residuals contributed by the reagent. Hence, the present invention is readily differentiated from previous waterproofing methods involving treatment of a polymeric matrix with alkylpolysiloxanes or the like to coat the matrix.

As mentioned, in accordance with the present invention, the interconnected pores in the hydrophilic microporous sheet may be rendered hydrophobic by treatment with a wide variety of substituted silanes or silazanes, as well as by organo substituted silanes or silazanes either in the liquid or vapor state, preferably those that readily penetrate the minute interstices or pores of the sheet. Applicable silanes, silazanes, organosilanes and organosilazanes, for example, are commercially available from Union Carbide Corporation, 270 Park Avenue, New York, New York 10017, General Electric Company, Waterford, New York 12188, and Dow Corning Corporation, Midland, Michigan 48640. The term "organo" is meant to include monovalent organic groups e.g. alkyl and cycloalkyl radicals such as methyl, ethyl, cyclohexyl and the like; aliphatically oxygenated radicals such as alkylethoxy, vinylethoxy and the like; aryl radicals such as phenyl, naphthyl, xenyl and the like; amino substituted forms of the monovalent organic group; and halogen substituted forms of the monovalent organic groups have noted, such as trimethylchloro, or the like. The foregoing treatment may be carried out by exposing the normally hydrophilic microporous material to a silane or silazane reagent in either vapor or liquid form. When treating with a liquid silane or silazane, it is preferable to reduce the viscosity of the reagent somewhat as by dissolving same in a suitable solvent such as benzene or hexane. A benzene or hexane solution having a liquid silane or silazane concentration of about 25 per cent is particularly preferred.

Alternatively, it has been further discovered that the pores in the microporous sheet can be rendered hydrophobic by treatment with Werner-type complexes of fatty acids coordinated with a metal, preferably those coordinated with chromium (Group VI) such as that sold under the trademark "Quinlon C" by E. I. du Pont de Nemours & Company, Inc., Wilmington, Delaware 19898. Quinlon C comes available in a 30 per cent isopropanol solution which is readily diluted further with water. The low viscosity of the solution facilitates penetration of the minute interstices or pores of the microporous material rendering the pores hydrophobic.

In order to more fully appreciate the manner in which the hydrophilic microporous material is rendered hydrophobic as contemplated by the present invention consider, for example, that the surface of the material contains many molecules represented as follows:

(1)

due to the dispersed silica therein. The active labile OH groups arising from the surface render the material normally hydrophilic. Now suppose the surface of the material is exposed to say, a trichloromethylsilane:

(2)

The trichloromethylsilane (2) reacts with each labile OH group on the silica (1) as follows:

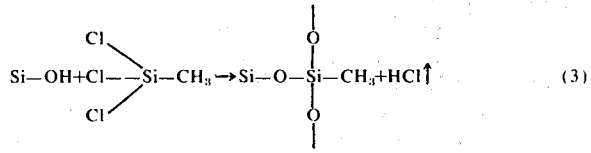
(3)

Since each OH group arising from the surface of the silica has now been replaced by an organic radical, i.e., a $CH_3$ (methyl) group, the contact angle of water deposited on the surface of the micropores will be too great to permit wetting thereby rendering the material hydrophobic.

Alternatively, suppose now that the surface molecules of the material represented in (1) are exposed to a Werner-type complex of fatty acids coordinated with a Group VI metal (chromium) such as Quinlon C which latter may be represented as:

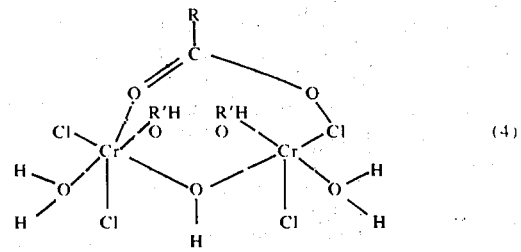
(4)

Where R represents a fatty acid radical ($C_{13}$–$C_{17}$) and R' is an alkyl of the alcohol in which it is dissolved or dispersed. Due to its positive valence, the Quinlon C forms a strong bond with the negative polar (OH) groups arising from the surface of the material to yield:

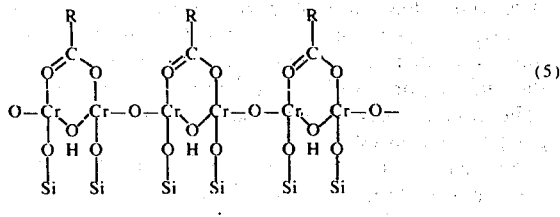

(5)

It will be noted that upon drying of the treated material the $H_2O$ molecules are irreversibly removed from the Werner-type complex and, accordingly, the fatty acid radicals will be found arising from the surface of the treated substrate. By virtue of such fatty acid radicals, the contact angle of water deposited on the surface of the material will be too great to permit wetting thereby rendering the material hydrophobic.

The present invention will now be more fully described by way of the following Examples, it being understood, however, that such Examples are not to be construed as limiting.

EXAMPLES 1 – 12

A sheet of microporous material was prepared by thoroughly intermixing 100 parts by weight of finely divided polyvinyl chloride (Geon 103 EPF 10), 139 parts of finely divided precipitated hydrated silica (Hi-Sil 233), 199 parts of water and 199 parts of cyclohexanone in a low shear blender to form a stable, damp powder blend. The latter was then extruded directly into the nip of a calender roll to produce a flat sheet 0.030 inches thick nominal. The calendered sheet was immersed in an extraction water bath for 15 minutes at 80°C to extract the cyclohexanone and then air-dried in an oven maintained at 120°C for 7 – 10 minutes to remove all traces of water and cyclohexanone. Sample specimens 4.45cm in diameter were then punched from the finished microporous sheet using a conventional arbor press and treated by exposure to the vapors of a different silane or silazane reagent as follows:

| Example | Reagent | Catalog No. |
|---|---|---|
| 1 | Trimethylchlorosilane | SC-3001 (General Electric) |
| 2 | Diphenyldimethoxysilane | Z-6074 (Dow Corning) |
| 3 | Dimethyldiethoxysilane | SC-3902 (General Electric) |
| 4 | Hexamethyldisilazane | SC-3700 (General Electric) |
| 5 | Trichlorosilane | SC-3100 (General Electric) |
| 6 | Gamma-aminopropyltriethoxysilane | SC-3900 (General Electric) |
| 7 | Methyltriethoxysilane | SC-3903 (General Electric) |
| 8 | Phenyltrichlorosilane | SC-3023 (General Electric) |
| 9 | Phenyltriethoxysilane | SC-3923 (General Electric) |
| 10 | Vinyltriethoxysilane | SC-3735 (General Electric) |
| 11 | Vinyltrichlorosilane | SC-3200 (General Electric) |
| 12 | Dimethyldichlorosilane | SC-3002 (General Electric) |

This vapor treatment was carried out by mounting each sample specimen in a desiccator containing 25cc of the corresponding silane or silazane reagent mentioned above, respectively. The sample was mounted above the surface of the liquid reagent within the desiccator in a manner which gave minimum contact with other internal surfaces of the desiccator. The desiccator was then sealed and placed in an oven maintained at 60°C for 12 hours. After this treatment period, the desiccator was removed from the oven and allowed to cool for 2 hours to room temperature. Subsequently, each sample was removed from its respective desiccator and allowed to condition in open air for a further period of 24 hours, to allow any unreacted silanes to escape.

EXAMPLES 13 – 16

Sample specimens 4.45cm in diameter prepared from the same microporous sheet material of Examples 1 – 12 were treated by exposure to a liquid silane or silazane as follows:

| Example | Reagent | Catalog No. |
|---|---|---|
| 13 | Trimethylchlorosilane | SC-3001 (General Electric) |
| 14 | Diphenyldimethoxysilane | Z-6074 (Dow Corning) |
| 15 | Dimethyldiethoxysilane | SC-3902 (General Electric) |
| 16 | Hexamethyldisilazane | SC-3700 (General Electric) |

Each Example was immersed in a hexane solvent solution containing three parts solvent for each part silane or silazane reagent. Total immersion time was 5 minutes. The silane or silazane treated sample was then removed from the liquid solution and allowed to condition in the open air for 24 hours.

EXAMPLES 17 – 20

A sheet of microporous material was prepared by thoroughly intermixing 100 parts by weight of natural rubber, 165.5 parts of silica hydrogel, 3.1 parts inert filler (rubber dust), 39.0 parts sulfur, 0.8 parts stearic acid and 0.8 parts diphenylguanidine in a Banbury mixer to produce a homogeneous mixture. This mixture was then extruded into sheet form and calendered to 0.25 inches thick nominal. The calendered sheet was wound on a reel and vulcanized in an autoclave for 35 minutes at 172°C and 155 psig. The vulcanized sheet was then air-dried in an oven to remove all traces of moisture. Sample specimens 4.45cm in diameter were then punched from the finished microporous sheet on an arbor press and treated by exposure to the vapors of the following silanes and silazane:

| Example | Reagent | Catalog No. |
|---|---|---|
| 17 | Trimethylchlorosilane | SC-3001 (General Electric) |
| 18 | Diphenyldimethoxysilane | Z-6074 (Dow Corning) |

-continued

| Example | Reagent | Catalog No. |
|---------|---------|-------------|
| 19 | Dimethyldiethoxysilane | SC-3902 (General Electric) |
| 20 | Hexamethyldisilazane | SC-3700 (General Electric) |

The vapor treatment was carried out in the same manner mentioned above in connection with Examples 1 – 12, that is, each specimen was mounted in a desiccator containing 25cc of the corresponding silane or silazane reagent. The desiccator was then sealed and placed in an oven maintained at 60°C for 12 hours. The desiccator was then removed from the oven and allowed to cool for 2 hours to room temperature. Subsequently, each sample was removed from its respective desiccator and allowed to condition in open air for a further period of 24 hours.

EXAMPLES 21 – 24

Sample specimens 4.45cm in diameter were prepared from the same microporous sheet material of Examples 17 – 20 and were treated in the same manner as Examples 13 – 16, that is, they were immersed for 5 minutes in a 25 per cent silane or silazane solution in liquid hexane solvent as follows:

| Example | Reagent | Catalog No. |
|---------|---------|-------------|
| 21 | Trimethylchlorosilane | SC-3001 (General Electric) |
| 22 | Diphenyldimethoxysilane | Z-6074 (Dow Corning) |
| 23 | Dimethyldiethoxysilane | SC-3902 (General Electric) |
| 24 | Hexamethyldisilazane | SC-3700 (General Electric) |

After treatment as described above, each of Examples 1 – 24 was tested for nitrogen gas permeability in comparison to identically formed specimens which had not been so treated. In addition, each treated Example was tested for resistence to the transmission of liquid water in comparison to identically formed untreated samples. In measuring each sample (both treated and untreated) for nitrogen gas permeability, the sample specimens were mounted in a gas permeation cell comprising a sealed enclosure having an inlet at one end connected to a source of regulated pressurized nitrogen and an outlet at its other end connected to a flow meter (rotameter) or to a liquid displacement gas collector. The sample was mounted interiorly of the gas permeation cell between a sealing gasket and a perforated disc. Pressure was applied to one face of the sample in the cell by adjusting the regulator on the nitrogen pressure source and increasing the pressure from 0 psig to 40 psig in 5 psig increments and the flow rate (liters/min.) was measured by the flow meter or by measuring the time required to displace 5 liters of liquid in the gas collection apparatus connected to the other side of the gas permeation cell.

As mentioned, each sample was also tested for liquid water permeability. This was done by means of a liquid permeation cell comprising a sealed enclosure having an inlet at one end connected to a source of regulated pressurized nitrogen gas. The cell contained about ½ inch of water and was sealed at its other end by the sample to be tested which latter was disposed between a sealing gasket and a perforated disc. On the underside of the perforated disc was disposed a blotter detector. Since the untreated microporous material is normally hydrophilic, the water within the cell would rapidly wet through and be indicated on the blotter with no pressure gradient across the sample specimen (i.e., 0 psig nitrogen at the inlet). On the other hand, however, samples treated in accordance with the invention did not wet the blotter at 0 psig, but instead, required a positive nitrogen pressure to be applied through the inlet of the liquid permeation cell in order to cause liquid water to permeate through the sample and be indicated on the blotter in the form of an individual wet spot. The hydrophobicity of each treated sample, i.e., its water repellency, was thus measured in the liquid permeation cell by increasing the nitrogen pressure within the cell from 0 in 2 psig increments every 2 minutes. The measured flow rates of nitrogen gas at a pressure of 30 psig through each of the samples corresponding to Examples 1 – 24 as well as the positive nitrogen pressure required to pass liquid water through each of the treated samples corresponding to Examples 1 – 24 are set forth in Table I below. This Table also gives the comparative measurements for identically formed untreated samples.

TABLE I

PERMEABILITY PROPERTIES OF EXAMPLES 1 – 24

| Example | Reagent | Method of Treatment | Flow Rate of Nitrogen, l/min. at 30 psig Before | After | Pressure Required to Pass Liquid Water, psig Before | After |
|---------|---------|---------------------|------|-------|--------|-------|
| 1 | Trimethylchlorosilane | Vapor | 0.940 | 0.900 | 0 | 16 |
| 2 | Diphenyldimethoxysilane | Vapor | 0.945 | 0.920 | 0 | 4 |
| 3 | Dimethyldiethoxysilane | Vapor | 0.935 | 0.710 | 0 | 14 |
| 4 | Hexamethyldisilazane | Vapor | 0.965 | 0.950 | 0 | 16 |
| 5 | Trichlorosilane | Vapor | *0.315 | *0.315 | 0 | 8–10 |
| 6 | Gamma-aminopropyltriethoxysilane | Vapor | *0.625 | *0.445 | 0 | 8–10 |
| 7 | Methyltriethoxysilane | Vapor | *0.360 | *0.360 | 0 | 8–10 |
| 8 | Phenyltrichlorosilane | Vapor | *0.365 | *0.335 | 0 | 8–10 |
| 9 | Phenyltriethoxysilane | Vapor | *0.400 | *0.370 | 0 | 8–10 |
| 10 | Vinyltriethoxysilane | Vapor | *0.400 | *0.365 | 0 | 8–10 |
| 11 | Vinyltrichlorosilane | Vapor | *0.285 | *0.285 | 0 | 8–10 |
| 12 | Dimethyldichlorosilane | Vapor | *0.385 | *0.335 | 0 | 8–10 |
| 13 | Trimethylchlorosilane | Liquid Solution | 0.775 | 0.800 | 0 | 16 |
| 14 | Diphenyldimethoxysilane | Liquid Solution | 0.955 | 0.633 | 0 | 4 |
| 15 | Dimethyldiethoxysilane | Liquid Solution | 0.965 | 0.950 | 0 | 4 |
| 16 | Hexamethyldisilazane | Liquid Solution | 0.945 | 0.945 | 0 | 6–8 |
| 17 | Trimethylchlorosilane | Vapor | 0.740 | 0.690 | 0 | 18 |
| 18 | Diphenyldimethoxysilane | Vapor | 0.705 | 0.705 | 0 | 4 |
| 19 | Dimethyldiethoxysilane | Vapor | 0.750 | 0.730 | 0 | 14 |
| 20 | Hexamethyldisilazane | Vapor | 0.710 | 0.690 | 0 | 20 |
| 21 | Trimethylchlorosilane | Liquid Solution | 0.695 | 0.685 | 0 | 18–20 |

TABLE I-continued

PERMEABILITY PROPERTIES OF EXAMPLES 1 – 24

| Example | Reagent | Method of Treatment | Flow Rate of Nitrogen, 1/min. at 30 psig Before | After | Pressure Required to Pass Liquid Water, psig Before | After |
|---|---|---|---|---|---|---|
| 22 | Diphenyldimethoxysilane | Liquid Solution | 0.735 | 0.455 | 0 | 4 |
| 23 | Dimethyldiethoxysilane | Liquid Solution | 0.675 | 0.645 | 0 | 4 |
| 24 | Hexamethyldisilazane | Liquid Solution | 0.725 | 0.710 | 0 | 8 |

*Indicates four (4) sample specimens were mounted in stacked relationship in gas permeation cell to determine N₂ flow rate and that flow rate measurement was made by liquid displacement method.

From the Table it will be noted that the nitrogen gas permeability or flow rate for the treated and untreated samples remain substantially the same, whereas, with regard to permeability of liquid water, a significant positive pressure gradient is required to cause liquid water to flow through the treated Examples as compared to the untreated samples which readily passed liquid water at 0 psig nitrogen pressure.

EXAMPLE 25

A sheet of porous material 0.020 inches thick nominal was formed following the procedures described above in connection with Examples 1 – 12. From the finished sheet several samples were punched out on an arbor press each having a diameter of 12.7cm. A sample specimen then was saturated for 10 minutes at 20°C with a water solution containing 5 per cent by weight of Quinlon C, a Werner-type complex in which fatty acids are coordinated with chromium and which is available in a 30 per cent isopropanol solution from E. I. du Pont de Nemours & Company, Inc., Wilmington, Delaware 19898. After drying for 2 hours at 76°C, the treated samples were tested for nitrogen gas permeability and resistance to the flow of liquid water in comparison to untreated samples in the same manner described above in connection with Examples 1 – 24. Using a nitrogen pressure differential of 2.2 psig, a nitrogen gas flow rate of 13.6 liters/min. was measured through an untreated sample specimen. Under the same pressure conditions, the Quinlon C treated sample also passed therethrough 13.6 liters/min. of nitrogen gas. When the untreated sample was tested for flow with respect to liquid water, the untreated sample was naturally hydrophilic and water rapidly soaked into and through the material without any applied pressure. In sharp contrast, the treated sample required a pressure of 1.1 psig to force water therethrough.

EXAMPLE 26

Another sample obtained from the sheet of microporous material prepared in accordance with Example 25 was saturated for 10 minutes at 20°C in Quinlon C, i.e., an isopropanol solution containing 30 per cent by weight of a Werner-type complex in which fatty acids are coordinated with chromium, and then dried for 4 hours at 76°C. Using a nitrogen pressure of 0.22 psig across an untreated sample, 13.3 liters/min. nitrogen gas passed therethrough. Under the same pressure conditions, the treated sample had a measured flow rate with respect to nitrogen gas of 4.6 liters/min. When the untreated sample was tested for flow with respect to liquid water, the untreated sample was naturally hydrophilic and liquid water rapidly soaked into and through the material without any applied pressure. On the other hand, the treated sample required a pressure of 8 psig to pass the liquid water therethrough.

EXAMPLE 27

Still another sample obtained from the microporous sheet of Example 25 was saturated at 20°C with a water solution containing 3 per cent by weight of Quinlon C and dried for 2 hours at 76°C. The treated and untreated samples readily passed nitrogen gas therethrough at substantially equal rates over a range of pressure differentials. When tested for flow with respect to liquid water, the untreated sample was naturally hydrophilic and liquid water rapidly soaked through the material without any applied pressure and passed therethrough. In contrast, liquid water placed on the treated sample formed beads on the surface thereof and did not wet nor soak into the treated material. It required a pressure of 8 psig across the treated sample to pass the liquid water therethrough.

EXAMPLE 28

A sheet of porous material 0.030 inches thick nominal was formed following the procedures described above in connection with Examples 17 – 24. From the finished sheet of microporous material several samples were punched out on an arbor press each having a diameter of 12.7cm. A sample specimen was saturated for 10 minutes at 20°C with a water solution containing 3 per cent by weight Quinlon C and dried for 2 hours at 76°C. The treated and untreated samples of the sheet readily passed nitrogen gas therethrough at substantially equal rates over a range of various pressure differentials. When tested for flow with respect to liquid water, the untreated sample was naturally hydrophilic and liquid water rapidly soaked into and through the material without applied pressure. In contrast, liquid water did not wet the treated sample and required a nitrogen gas pressure of 7 psig to force the water therethrough.

EXAMPLE 29

Another sample obtained from the sheet of microporous material prepared in accordance with Example 28 was saturated at 20°C with Quinlon C, i.e., an isopropanol solution containing 30 per cent by weight of a Werner-type complex in which fatty acids are coordinated with chromium, and then dried 4 hours at 76°C. Both the treated and untreated samples of the sheet readily passed nitrogen gas therethrough at substantially equal rates over a range of various nitrogen gas pressure differentials. When tested for flow with respect to liquid water, the untreated sample was naturally hydrophilic and liquid water rapidly soaked into and through the sample. In contrast, liquid water did not wet the treated sample but merely beaded up on the surface thereof without passing therethrough.

From the foregoing it will be appreciated that the present invention discloses novel methods of treating normally hydrophilic microporous materials whereby the latter are rendered hydrophobic. Accordingly, the present invention should be limited only by the true spirit and scope of the appended claims.

What is claimed is:

1. A process for producing a gas permeable hydrophobic article from a normally hydrophobic microporous material characterized by a polymeric matrix and a filler dispersed throughout said matrix forming a plurality of micropores therein, said filler comprising a compound having an active polar group, said process comprising the step of reacting the filler compound dispersed throughout said polymeric matrix with a silane whereby the contact angle of a water-based liquid deposited on the surface of said article after said reaction is rendered too great to permit wetting of said article therewith.

2. The process defined in claim 1 wherein the silane is an organo-substituted silane.

3. The process defined in claim 1 wherein the silane is in liquid form during said reaction.

4. The process of claim 1 wherein the silane is in vapor form during said reaction.

5. The process of claim 1 wherein said silane is dissolved in a solvent during said reaction.

6. The process defined in claim 1 wherein the polymeric matrix comprises a synthetic or natural thermosetting polymer or copolymer thereof.

7. The process of claim 1 wherein the polymeric matrix comprises a thermoplastic polymeric resin or copolymer thereof.

8. The process defined in claim 6 wherein said normally hydrophilic microporous material is formed by:
 a. blending together suitable quantities of said thermosetting polymer or copolymer thereof, a filler compound having an active polar group and a curing agent to form a composition;
 b. vulcanizing said composition in a pressurized steam ambient; and
 c. dehydrating the resulting vulcanizate.

9. The process defined in claim 8 wherein said thermosetting polymer or copolymer thereof is natural rubber, said filler compound is silicic acid and said curing agent is sulfur.

10. The process defined in claim 7 wherein said normally hydrophilic microporous material is formed by:
 a. blending together suitable quantities of said thermoplastic resin, a filler compound having an active polar group, solvent, and water to form a composition;
 b. extruding or molding said composition at room temperature or above to form an extrudate;
 c. passing said extrudate through an extraction medium to replace said solvent therein with said extraction medium; and
 d. removing said extraction medium from said extrudate.

11. The process defined in claim 10 wherein said thermoplastic resin is polyvinyl chloride, said filler is silicic acid and said extraction medium is water.

12. The reaction product of claim 1.

13. The reaction product of claim 2.

14. A process for producing a gas permeable hydrophobic article from a normally hydrophilic microporous material characterized by a polymeric matrix and a filler dispersed throughout said matrix forming a plurality of micropores therein, said filler comprising a compound having an active polar group, said process comprising the step of reacting the filler compound dispersed throughout said polymeric matrix with a silazane whereby the contact angle of a water-based liquid deposited on the surface of said article after said reaction is rendered too great to permit the wetting of said article therewith.

15. The process defined in claim 14 wherein the silazane is an organo-substituted silazane.

16. The process defined in claim 14 wherein the silazane is in liquid form during said reaction.

17. The process of claim 14 wherein the silazane is in vapor form during said reaction.

18. The process of claim 14 wherein said silazane is dissolved in a solvent during said reaction.

19. The process defined in claim 14 wherein the polymeric matrix comprises a synthetic or natural thermosetting polymer or copolymer thereof.

20. The process of claim 14 wherein the polymeric matrix comprises a thermoplastic polymeric resin or copolymer thereof.

21. The process defined in claim 19 wherein said normally hydrophilic microporous material is formed by:
 a. blending together suitable quantities of said thermosetting polymer or copolymer thereof, a filler compound having an active polar group and a curing agent to form a composition;
 b. vulcanizing said composition in a pressurized steam ambient; and
 c. dehydrating the resulting vulcanizate.

22. The process defined in claim 21 wherein said thermosetting polymer or copolymer thereof is natural rubber, said filler compound is a silicic acid and said curing agent is sulfur.

23. The process defined in claim 20 wherein said normally hydrophilic microporous material is formed by:
 a. blending together suitable quantities of said thermoplastic resin, a filler compound having an active polar group, solvent, and water to form a composition;
 b. extruding or molding said composition at room temperature or above to form an extrudate;
 c. passing said extrudate through an extraction medium to replace said solvent therein with said extraction medium; and
 d. removing said extraction medium from said extrudate.

24. The process defined in claim 23 wherein said thermoplastic resin is polyvinyl chloride, said filler is silicic acid and said extraction medium is water.

25. The reaction product of claim 14.

26. The reaction product of claim 15.

27. A process for producing a gas permeable hydrophobic article from a normally hydrophilic microporous material characterized by a polymeric matrix and a filler dispersed throughout said matrix forming a plurality of micropores therein, said filler comprising a compound having an active polar group, said process comprising the step of reacting the filler compound dispersed throughout said polymeric matrix with a Werner-type complex of fatty acids coordinated with a metal whereby the contact angle of a water-based liquid deposited on the surface of said article after said reaction is rendered too great to permit wetting of said article therewith.

28. The process of claim 27 wherein said coordinating metal is chromium.

29. The process of claim 27 wherein said Werner-type complex is dissolved in a solvent during said reaction.

30. The process of claim 29 wherein said solvent is isopropanol and the concentration of said Werner-type complex therein is about 30 per cent by weight.

31. The process of claim 27 wherein said Werner-type complex is dissolved in a solvent and water solution during said reaction.

32. The process defined in claim 27 wherein the polymeric matrix comprises a synthetic or natural thermosetting polymer or copolymer thereof.

33. The process defined in claim 32 wherein said normally hydrophilic microporous material is formed by:
   a. blending together suitable quantities of said thermosetting polymer or copolymer thereof, a filler compound having an active polar group, and a curing agent to form a composition;
   b. vulcanizing said composition in a pressurized steam ambient; and
   c. dehydrating the resulting vulcanizate.

34. The process defined in claim 33 wherein said thermosetting polymer or copolymer thereof is natural rubber, said filler compound is a silicic acid, and said curing agent is sulfur.

35. The process of claim 27 wherein the polymeric matrix comprises a thermoplastic polymeric resin or copolymer thereof.

36. The process defined in claim 35 wherein said normally hydrophilic microporous material is formed by:
   a. blending together suitable quantities of said thermoplastic resin, a filler compound having an active polar group, solvent, and water to form a composition;
   b. extruding or molding said composition at room temperature or above to form an extrudate;
   c. passing said extrudate through an extraction medium to replace said solvent therein with said extraction medium; and
   d. removing said extraction medium from said extrudate.

37. The process defined in claim 36 wherein said thermoplastic resin is polyvinyl chloride, said filler is silicic acid and said extraction medium is water.

38. The reaction product of claim 27.

* * * * *